US008660380B2

(12) United States Patent  (10) Patent No.: US 8,660,380 B2
Bulusu et al.  (45) Date of Patent: Feb. 25, 2014

(54) METHOD AND SYSTEM FOR PERFORMING TWO-DIMENSIONAL TRANSFORM ON DATA VALUE ARRAY WITH REDUCED POWER CONSUMPTION

(75) Inventors: Ravi Bulusu, Santa Clara, CA (US); Partha Sriram, Los Altos, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1128 days.

(21) Appl. No.: 11/510,218

(22) Filed: Aug. 25, 2006

(65) Prior Publication Data

US 2008/0050036 A1    Feb. 28, 2008

(51) Int. Cl.
*G06K 9/36*    (2006.01)
(52) U.S. Cl.
USPC ........... 382/281; 382/276; 382/277; 382/305; 382/245; 382/248
(58) Field of Classification Search
USPC .................. 382/281, 276, 277, 305, 245, 248
See application file for complete search history.

(56) References Cited

U.S. PATENT DOCUMENTS

| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |

(Continued)

FOREIGN PATENT DOCUMENTS

| CN | 1489391 | 4/2004 |
| EP | 1283640 | 2/2003 |

(Continued)

OTHER PUBLICATIONS

Rohini Krishnan, et al., "Design of a 2D DCT/IDCT Application Specific VLIW Processor Supporting Scaled and Sub-sampled Blocks," 16th International Conference on VLSI Design, 2003, six pages.

(Continued)

*Primary Examiner* — Mike Rahmjoo

(57) ABSTRACT

In some embodiments, a method for performing and a system configured to perform a 2D transform (for example, an inverse discrete cosine transform) on each block of a sequence of data blocks, where the 2D transform includes a row transform and a column transform. To perform the row or column transform on a row or column of data, these embodiments determine whether each of different subsets of the data values comprising a partition of the row (column) includes at least one zero value, whether each of different subsets of a first subset of the partition includes at least one zero value, and whether each of different subsets of at least one other subset of the partition includes at least one zero value. When performing the row (column) transform on each row or column that includes at least one zero value and at least one non-zero value, at least one transformation operation on at least one zero value is bypassed or performed in a reduced-power manner, where such transformation operation would otherwise be performed in a manner consuming full power if the zero value were a non-zero value. In some embodiments, the system is a pipelined video decoding system or other video processing system (or a video processing subsystem of a portable media player or other system) including a transform engine implemented in accordance with the invention. Other aspects are transform engines and transform engine circuitry for use in any embodiment of the system.

16 Claims, 4 Drawing Sheets

(56) References Cited

U.S. PATENT DOCUMENTS

| | | | |
|---|---|---|---|
| 4,755,810 A | 7/1988 | Knierim | |
| 4,814,978 A | 3/1989 | Dennis | |
| 4,992,857 A | 2/1991 | Williams | |
| 5,045,940 A | 9/1991 | Peters et al. | |
| 5,130,797 A | 7/1992 | Murakami et al. | |
| 5,146,324 A | 9/1992 | Miller et al. | |
| 5,212,742 A | 5/1993 | Normile et al. | |
| 5,225,875 A | 7/1993 | Shapiro et al. | |
| 5,233,689 A | 8/1993 | Rhoden et al. | |
| 5,267,334 A | 11/1993 | Normille et al. | |
| 5,267,344 A | 11/1993 | Nelson, III | |
| 5,369,744 A | 11/1994 | Fukushima et al. | |
| 5,371,896 A | 12/1994 | Gove et al. | |
| 5,596,369 A | 1/1997 | Chau | |
| 5,598,514 A | 1/1997 | Purcell et al. | |
| 5,608,652 A | 3/1997 | Astle | |
| 5,613,146 A | 3/1997 | Gove et al. | |
| 5,623,311 A | 4/1997 | Phillips et al. | |
| 5,630,033 A | 5/1997 | Purcell et al. | |
| 5,646,692 A | 7/1997 | Bruls | |
| 5,657,465 A | 8/1997 | Davidson et al. | |
| 5,768,429 A | 6/1998 | Jabbi et al. | |
| 5,790,881 A | 8/1998 | Nguyen | |
| 5,809,538 A | 9/1998 | Pollmann et al. | |
| 5,821,886 A | 10/1998 | Son | |
| 5,845,083 A | 12/1998 | Hamadani et al. | |
| 5,870,310 A | 2/1999 | Malladi | |
| 5,883,823 A | 3/1999 | Ding | 364/725.03 |
| 5,889,949 A | 3/1999 | Charles | |
| 5,898,881 A | 4/1999 | Miura et al. | |
| 5,909,224 A | 6/1999 | Fung | |
| 5,923,375 A | 7/1999 | Pau | |
| 5,954,786 A | 9/1999 | Volkonsky | |
| 5,969,728 A | 10/1999 | Dye et al. | |
| 5,999,220 A | 12/1999 | Washino | |
| 6,035,349 A | 3/2000 | Ha et al. | |
| 6,073,185 A | 6/2000 | Meeker | |
| 6,088,355 A | 7/2000 | Mills et al. | |
| 6,098,174 A | 8/2000 | Baron et al. | |
| 6,104,470 A | 8/2000 | Streefkerk et al. | |
| 6,144,362 A | 11/2000 | Kawai | |
| 6,148,109 A | 11/2000 | Boon et al. | |
| 6,157,751 A | 12/2000 | Olson et al. | |
| 6,175,594 B1 | 1/2001 | Strasser et al. | |
| 6,188,799 B1 | 2/2001 | Tan et al. | |
| 6,195,389 B1 | 2/2001 | Rodriguez et al. | |
| 6,222,883 B1 | 4/2001 | Murdock et al. | |
| 6,269,174 B1 | 7/2001 | Koba et al. | |
| 6,272,281 B1 | 8/2001 | De Vos et al. | |
| 6,305,021 B1 | 10/2001 | Kim | |
| 6,311,204 B1 | 10/2001 | Mills | |
| 6,317,124 B2 | 11/2001 | Reynolds | |
| 6,356,945 B1 | 3/2002 | Shaw et al. | |
| 6,360,234 B2 | 3/2002 | Jain et al. | |
| 6,418,166 B1 | 7/2002 | Wu et al. | |
| 6,459,738 B1 | 10/2002 | Wu et al. | |
| 6,539,060 B1 | 3/2003 | Lee et al. | |
| 6,539,120 B1 | 3/2003 | Sita et al. | |
| 6,560,629 B1 | 5/2003 | Harris | |
| 6,647,062 B2 | 11/2003 | Mackinnon | |
| 6,665,346 B1 | 12/2003 | Lee et al. | |
| 6,687,788 B2 | 2/2004 | Vorbach et al. | |
| 6,690,835 B1 | 2/2004 | Brockmeyer et al. | |
| 6,690,836 B2 | 2/2004 | Natarajan et al. | |
| 6,721,830 B2 | 4/2004 | Vorbach et al. | |
| 6,751,721 B1 | 6/2004 | Webb, Jr. et al. | |
| 6,760,478 B1 * | 7/2004 | Adiletta et al. | 382/236 |
| 6,782,052 B2 | 8/2004 | Sun et al. | |
| 6,799,192 B1 * | 9/2004 | Handley | 708/402 |
| 6,807,317 B2 | 10/2004 | Mathew et al. | |
| 6,823,443 B2 | 11/2004 | Horiyama et al. | |
| 6,950,473 B2 | 9/2005 | Kim et al. | |
| 6,996,645 B1 | 2/2006 | Wiedenman et al. | |
| 7,038,687 B2 | 5/2006 | Booth, Jr. et al. | |
| 7,173,631 B2 | 2/2007 | Anderson | |
| 7,260,148 B2 | 8/2007 | Sohm | |
| 7,277,101 B2 | 10/2007 | Zeng | |
| 7,289,672 B2 | 10/2007 | Sun et al. | |
| 7,379,501 B2 | 5/2008 | Lainema | |
| 7,403,564 B2 | 7/2008 | Laksono | |
| 7,450,640 B2 | 11/2008 | Kim et al. | |
| 7,499,491 B2 | 3/2009 | Lee et al. | |
| 7,548,586 B1 | 6/2009 | Mimar | |
| 7,548,596 B2 | 6/2009 | Yen et al. | |
| 7,551,671 B2 | 6/2009 | Tyldesley et al. | |
| 7,565,077 B2 | 7/2009 | Rai et al. | |
| 7,581,182 B1 | 8/2009 | Herz | |
| 7,630,097 B2 | 12/2009 | Kodama et al. | |
| 7,689,000 B2 | 3/2010 | Kazama | |
| 7,693,219 B2 | 4/2010 | Yan | |
| 7,720,311 B1 | 5/2010 | Sriram | |
| 7,721,069 B2 | 5/2010 | Ramchandran et al. | |
| 7,924,923 B2 | 4/2011 | Lee et al. | |
| 8,009,923 B2 | 8/2011 | Li et al. | |
| 8,369,402 B2 | 2/2013 | Kobayashi et al. | |
| 2001/0020941 A1 | 9/2001 | Reynolds | |
| 2001/0024448 A1 | 9/2001 | Takase et al. | |
| 2001/0028353 A1 | 10/2001 | Cheng | |
| 2001/0028354 A1 | 10/2001 | Cheng et al. | |
| 2002/0015445 A1 | 2/2002 | Hashimoto | |
| 2002/0015513 A1 | 2/2002 | Ando et al. | |
| 2002/0025001 A1 | 2/2002 | Ismaeil et al. | |
| 2002/0041626 A1 | 4/2002 | Yoshioka et al. | |
| 2002/0109790 A1 | 8/2002 | Mackinnon | |
| 2002/0114394 A1 | 8/2002 | Ma | |
| 2002/0118743 A1 | 8/2002 | Jiang | |
| 2003/0020835 A1 | 1/2003 | Petrescu | |
| 2003/0048361 A1 | 3/2003 | Safai | |
| 2003/0078952 A1 * | 4/2003 | Kim et al. | 708/401 |
| 2003/0141434 A1 | 7/2003 | Ishikawa et al. | |
| 2003/0161400 A1 | 8/2003 | Dinerstein et al. | |
| 2004/0057523 A1 | 3/2004 | Koto et al. | |
| 2004/0095998 A1 | 5/2004 | Luo et al. | |
| 2004/0100466 A1 | 5/2004 | Deering | |
| 2004/0150841 A1 | 8/2004 | Lieberman et al. | |
| 2004/0156435 A1 | 8/2004 | Itoh et al. | |
| 2004/0174998 A1 | 9/2004 | Youatt et al. | |
| 2004/0181564 A1 | 9/2004 | MacInnis et al. | |
| 2004/0181800 A1 | 9/2004 | Rakib et al. | |
| 2004/0190613 A1 | 9/2004 | Zhu et al. | |
| 2004/0190617 A1 | 9/2004 | Shen et al. | |
| 2004/0202245 A1 | 10/2004 | Murakami et al. | |
| 2004/0213348 A1 | 10/2004 | Kim et al. | |
| 2004/0218626 A1 | 11/2004 | Tyldesley et al. | |
| 2004/0218675 A1 | 11/2004 | Kim et al. | |
| 2004/0228415 A1 | 11/2004 | Wang | |
| 2004/0257434 A1 | 12/2004 | Davis et al. | |
| 2005/0008254 A1 | 1/2005 | Ouchi et al. | |
| 2005/0033788 A1 | 2/2005 | Handley | |
| 2005/0047502 A1 | 3/2005 | McGowan | |
| 2005/0066205 A1 | 3/2005 | Holmer | |
| 2005/0079914 A1 | 4/2005 | Kaido et al. | |
| 2005/0105618 A1 | 5/2005 | Booth et al. | |
| 2005/0123040 A1 | 6/2005 | Bjontegard | |
| 2005/0190976 A1 | 9/2005 | Todoroki et al. | |
| 2005/0238102 A1 | 10/2005 | Lee et al. | |
| 2005/0238103 A1 | 10/2005 | Subramaniyan et al. | |
| 2005/0265454 A1 | 12/2005 | Muthukrishnan et al. | |
| 2005/0276493 A1 | 12/2005 | Xin et al. | |
| 2005/0281337 A1 | 12/2005 | Kobayashi et al. | |
| 2005/0286630 A1 | 12/2005 | Tong et al. | |
| 2006/0002466 A1 | 1/2006 | Park | |
| 2006/0017802 A1 | 1/2006 | Yoo et al. | |
| 2006/0056513 A1 | 3/2006 | Shen et al. | |
| 2006/0056708 A1 | 3/2006 | Shen et al. | |
| 2006/0109910 A1 | 5/2006 | Nagarajan | |
| 2006/0115001 A1 | 6/2006 | Wang et al. | |
| 2006/0133501 A1 | 6/2006 | Lee et al. | |
| 2006/0133506 A1 | 6/2006 | Dang | |
| 2006/0176299 A1 | 8/2006 | Subbalakshmi et al. | |
| 2006/0176962 A1 | 8/2006 | Arimura et al. | |
| 2006/0203916 A1 | 9/2006 | Chandramouly et al. | |
| 2007/0002945 A1 | 1/2007 | Kim | |
| 2007/0002950 A1 | 1/2007 | Yang | |

(56) References Cited

U.S. PATENT DOCUMENTS

| | | |
|---|---|---|
| 2007/0036215 A1 | 2/2007 | Pan et al. |
| 2007/0070080 A1 | 3/2007 | Graham et al. |
| 2007/0133689 A1 | 6/2007 | Park et al. |
| 2007/0171981 A1 | 7/2007 | Qi |
| 2007/0217506 A1 | 9/2007 | Yang et al. |
| 2007/0230564 A1 | 10/2007 | Chen et al. |
| 2007/0274389 A1 | 11/2007 | Kim et al. |
| 2007/0286284 A1 | 12/2007 | Ito et al. |
| 2007/0286508 A1 | 12/2007 | Le Leannec et al. |
| 2008/0069203 A1 | 3/2008 | Karczewicz et al. |
| 2008/0117214 A1 | 5/2008 | Perani et al. |
| 2008/0137726 A1 | 6/2008 | Chatterjee et al. |
| 2008/0151997 A1 | 6/2008 | Oguz |
| 2008/0285444 A1 | 11/2008 | Diab et al. |
| 2009/0060277 A1 | 3/2009 | Zhang et al. |
| 2009/0086827 A1 | 4/2009 | Wu et al. |
| 2009/0116549 A1 | 5/2009 | Shen et al. |
| 2009/0122864 A1 | 5/2009 | Palfner et al. |
| 2009/0161763 A1 | 6/2009 | Rossignol et al. |
| 2009/0196350 A1 | 8/2009 | Xiong |
| 2009/0268974 A1 | 10/2009 | Takagi |
| 2010/0034268 A1 | 2/2010 | Kusakabe et al. |

FOREIGN PATENT DOCUMENTS

| | | |
|---|---|---|
| GB | 2348559 | 10/2000 |
| JP | 04162893 | 6/1992 |
| JP | 11096138 | 4/1999 |
| JP | 2001184323 | 7/2001 |
| JP | 2005354686 | 12/2005 |
| JP | 2006287315 | 10/2006 |
| WO | 9827742 | 6/1998 |
| WO | 0233650 | 4/2002 |
| WO | 2005001625 | 6/2003 |
| WO | 2005096168 | 10/2005 |
| WO | 2006085137 | 8/2006 |

OTHER PUBLICATIONS

US Patent Application Publication No. 2005/0033788, Handley, Pub. Date Feb. 10, 2005.

"Ralf Schafer et al.,", "H.264/AVC", Dated: Jan. 2003, pp. 1-12.

_The Merriam-Webster Dictionary_. 2005 ed. Springfield, MA: Merriam-Webster Inc., 2005.

A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.

Advanced Video Coding for generic audiovisual services, Telecommunication Standardization Sector of ITU, Dated Mar. 2005, pp. 1-343.

Andrew Gibson, "H.264 Video Encoding Standard", year Aug. 2002, pp. 1-98, Queens University Kingston Ontario Canada.

Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.

Hannuksela, Miska et al., "Random Access Using Isolated Regions", IEEE 2003, pp. III-841 to III to 844.

Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.

Jamil-Ur-Rehman and Dr. Zhang Ye, "Efficient Techniques for Signaling Intra Prediction modes of H.264/Mpeg-4 Part 10", Proceedings of the First International Conference on Innovative Computing, Information and Control, ICICIC, Year 2006, pp. 1-4.

Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.

Realization of Low-Bit_Ratio Video Encoder Using Mpact Media Processor; Iwasaki, Junichi et al.; 1997.

Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.

Tourapis et al., Proc. Of SPIE Conf. Vis. Comm. And Img. Processing, vol. 3, pp. 1365-1373, Jun. '00.

Tu, C., Liang, J., and Tran, T. "Adaptive Runlength Coding", in_IEEE Signal Processing Letters_vol. 10, No. 3, pp. 61-6. Mar. 2003.

Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.

Zheng, et al., Inter. Conf. Info. Systems, Analysis and Synthesis, SCI 2001-ISAS 2001, vol. 13, 2001.

Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, JP000439487.

Kadono Shinya, et. Al. Revised edition H.264/AVC Textbook, Impress R&D, Jan. 1, 2006, pp. 131-133.

\* cited by examiner

METHOD AND SYSTEM FOR PERFORMING TWO-DIMENSIONAL TRANSFORM ON DATA VALUE ARRAY WITH REDUCED POWER CONSUMPTION

FIELD OF THE INVENTION

The invention pertains to methods and systems for performing two-dimensional (2D) transforms (e.g., inverse discrete cosine transforms or inverse Hadamard transforms) on 2D arrays of data values. In typical embodiments, the invention pertains to methods and circuitry for performing an inverse of a 2D orthogonal transform on a 2D array of image data values, each having a significant probability of being a zero value, in a manner reducing power consumption by avoiding power-consuming operations not needed to transform zero values.

BACKGROUND OF THE INVENTION

Throughout the disclosure, the term "block" of video data is used to denote a subset of the data comprising a frame of video data having spatial location within a rectangular region of the frame. A block of video data can but need not consist of compressed (or otherwise encoded) video data. Examples of blocks of video data are the conventionally defined macroblocks of MPEG-encoded video frames.

In many conventional applications, image data (e.g., video data) or other data undergo a two-dimensional ("2D") transform and the transformed data are later inverse transformed to recover the original data. Examples of such transforms include 2D discrete cosine transforms (two-dimensional "DCTs"), 2D Hadamard transforms, and 2D Fourier transforms.

Throughout the disclosure, the expression "bypassing" an operation (that would otherwise generate an operation output value) denotes generating or asserting a substitute output value (in place of the operation output value) without actually performing the operation. An example of "bypassing" an operation of asserting a zero value "z1" and a non-zero constant "c" to inputs of a multiplication circuit to cause the circuit to assert a current "cz1" at its output, asserting another zero value "z2" and different non-zero constant "d" to inputs of a second multiplication circuit to cause that circuit to assert a current "dz2" at its output, and operating an addition circuit in response to the currents "cz1" and "dz2" to assert an output voltage "cz1+dz2" (equal to zero volts above ground potential) at a node, would be to ground the node (thereby forcing it to ground potential) without actually performing the multiplication and addition steps in the multiplication circuits and addition circuit.

The present invention pertains to improved methods and systems for performing 2D transforms on 2D arrays of data values (i.e., arrays consisting of rows and columns of data values), where each of the values has a significant probability of being a zero value. In typical embodiments, the invention pertains to an improved method and system for performing an inverse transform of a 2D orthogonal transform (e.g., a 2D inverse discrete cosine transform or inverse Hadamard transform) on a 2D array of data values, where each of the values has a significant probability of being a zero value. In a class of preferred embodiments, the invention pertains to an improved method and system for performing a two-dimensional IDCT (2D inverse discrete cosine transform) on DCT coefficients. The DCT coefficients have been generated by performing a 2D discrete cosine transform on an array of video data (or other image data), and each has a significant probability of having the value zero.

Throughout this disclosure, the expression "zero value" (or "zero data value") denotes data indicative of the value zero. Similarly, the expression "zero input data value" denotes input data indicative of the value zero. For example, a zero input value can be a word of input data (e.g., a DCT coefficient, or a color component or pixel of video data) having the value zero.

Throughout this disclosure, the expression "sparse" data (e.g., a sparse block of data to undergo an inverse transform) denotes data indicative of values that are likely to be zero values. For example, a block of input data (e.g., a block of DCT coefficients) indicative of relatively many zero values and relatively few non-zero values is a sparse block of data.

Inverse transform implementation is typically a major part of the implementation of any system to be compliant any video compression and decompression standard. It is a computationally intensive process and contributes significantly to processing cycle and power consumption requirements. Mobile devices that implement video compression and decompression standards (e.g., portable media players) have especially stringent processing cycle and power consumption requirements: they need to meet the stringent performance requirements set by the application and to consume very low power to maximize battery life; and the transform engine typically must be able to support multiple compression standards and varying requirements that come with these standards.

Typical conventional implementations of 2D transforms (including 2D inverse transforms) on blocks of data use the following techniques in different combinations to improve performance or reduce power:

1. avoiding transformation of blocks that are identified by an external means as being uncoded blocks (where each input block provided to the transform engine is identified by the external means as being a coded or uncoded block). However, this technique has disadvantages, including in that it can result in performance of unnecessary transform operations (e.g., transformation of blocks that are identified as coded blocks but consist only of zero DC coefficients);

2. identifying full rows or columns of each input data block that consist entirely of zero values ("zero-rows" or "zero-columns") and bypassing normal transform operations that would otherwise be performed on each such row or column (e.g., by outputting predetermined values, typically "zero," for each zero-row or zero-column). The zero-rows and zero-columns can either be specified by an external device or identified internally by the transform engine. However, this conventional technique does not improve performance or reduce power in many common situations in which a row (or column) is not a zero-row (or zero-column) but is a sparsely populated row (or column) including only a very small number of non-zero values;

3. identifying (from the input data) conditions that indicate that the same coefficients (previously determined for use in multiplying data values in an input data row or column) should be used for multiplying data values in a subsequent input data row or column, and avoiding the updating of such coefficients that would otherwise be performed to determine new coefficients for multiplying the data values in the subsequent input data row or column; and 4. implementing a distributed arithmetic transform (a lookup table-based implementation of a 2D transform). A typical lookup table-based implementation reduces overhead by reducing the number of multiplication operations that must be performed to transform a block. However, designing such an implementation is typically very complicated because very large ROM tables and also multi-ported ROM are typically required, and design constraints typically limit the improvement in power consumption that can be achieved.

In another conventional 2D transform, described in US Patent Application Publication No. 2005/0033788 and related U.S. Pat. No. 6,799,192, the last non-zero entry in each column of a block of data is determined (when performing a column transform phase of an IDCT), and the transform system then branches to an appropriate one of eight different "specialized IDCT" program routines for implementing IDCT operations in software to inverse-transform each column. Apparently, simpler transform operations (requiring fewer multiplication and addition operations) could be employed to process a column having relatively many zeros (as indicated by having the last non-zero value in a higher position) and more complicated transform operations (requiring more multiplication and addition operations) could be employed to process a column having fewer zeros (as indicated by having the last non-zero value in a lower position). The references also teach that when performing a row transform phase of the IDCT (after the column transform phase), the last non-zero entry in each row of a block is determined and the transform system then branches to an appropriate one of eight different "specialized IDCT" program routines for implementing IDCT operations in software to inverse-transform each row.

There are a number of problems and limitations with the technique described in US Patent App. Publication No. 2005/0033788 and U.S. Pat. No. 6,799,192, including that the technique is inefficient in the sense that it does not improve performance or reduce power consumption when processing many columns and rows having typical patterns of zero and non-zero values. For example, when a column or row to be transformed includes zeros (especially, many zeros) but has a last entry that is non-zero, the technique would select a complicated (e.g., the most complicated) "specialized IDCT" routine that consumes much power to transform the column or row. In contrast, preferred embodiments of the present invention improve performance and reduce power consumption by avoiding transform operations on portions of rows and columns that consist of zero values (e.g., on each half-row or half-column, or each quarter-row or quarter-column, that consists of zero values) or performing such transform operations in a reduced-power manner. Some preferred embodiments of the present invention improve performance and reduce power consumption by avoiding transform operations on each individual zero value in a row or column to be transformed (or performing transform operations on each individual zero value in a row or column in a reduced-power manner).

There is no suggestion in US Patent App. Publication No. 2005/0033788 or U.S. Pat. No. 6,799,192 that the performance improvement and power consumption reduction benefits achievable by the technique disclosed therein can be increased by independently processing subsets of each row or column to be transformed, and not suggestion as to how to do so or as to whether it is possible to do so. In contrast, preferred embodiments of the present invention can sequentially perform the same operations on different subsets of each row or column to be transformed (e.g., inverse transformed), where the subsets of each row or column determine a partition of the row or column, and the performance improvement and power consumption reduction benefits achievable by such embodiments can be increased simply by decreasing the size of the subsets that determine each such partition. For example, some preferred embodiments of the present invention sequentially perform sets of operations on 2N-bit subsets of each 8N-bit row or column to be transformed (four sets of operations per row or column) to achieve excellent performance improvement and power consumption reduction benefits, and other preferred embodiments of the invention sequentially perform sets of operations on N-bit subsets of each 8N-bit row or column to be transformed (eight sets of operations per row or column) to achieve even better performance improvement and power consumption reduction benefits.

Another conventional 2D transform is described in the paper by Rohini Krishnan, et al., entitled "Design of a 2D DCT/IDCT Application Specific VLIW Processor Supporting Scaled and Sub-sampled Blocks," $16^{th}$ International Conference on VLSI Design, six pages (2003). This paper teaches asserting a downscaled version of full data block (e.g., an 8×4 block that has been generated by discarding even rows of an 8×8 block) to IDCT circuitry, and operating the IDCT circuitry to inverse-transform the downscaled block including by bypassing some of the IDCT circuitry that could otherwise have been used to inverse-transform the full block. This method can avoid calculation of output values that will eventually be discarded, but does not detect and skip operations that will not contribute in any way to the final result.

Another conventional 2D transform is described in U.S. Pat. No. 5,883,823. This transform identifies regions of an input block to be transformed, and processes each region differently (e.g., an IDCT is performed on all elements of some regions and an IDCT is performed only on non-zero elements of other regions). For example, U.S. Pat. No. 5,883,823 apparently teaches (at col. 10, line 53-col. 11, line 26) an IDCT computation in which a "regional" IDCT calculation is performed on all elements (whether zero or non-zero) of one quadrant of an 8×8 block (i.e., the 4×4 quadrant corresponding to the lowest frequency ranges), and another IDCT calculation is performed only on non-zero elements of each of the other three 4×4 quadrants of the 8×8 block (i.e., the three 4×4 quadrants corresponding to higher frequency ranges). However, U.S. Pat. No. 5,883,823 does not teach or suggest how to identify non-zero elements of each region for which an IDCT calculation is to be performed only on non-zero elements (or how efficiently to identify such non-zero coefficients), or how to perform an IDCT calculation only on non-zero elements of a region of a block, or how efficiently (and in a manner consuming reduced power) to perform such an IDCT calculation only on such non-zero elements.

SUMMARY OF THE INVENTION

In a class of embodiments, the invention is a system configured to perform a 2D transform (e.g., an inverse discrete cosine transform) on each block of a sequence of input data blocks, where each block comprises rows and columns of input data values, and the 2D transform includes a row transform and a column transform. In these embodiments, the system is configured to perform the 2D transform either by performing the row transform on all rows of each block to generate a block of partially transformed data and then the column transform on each column of the block of partially transformed data, or by performing the column transform on all columns of each block to generate a block of partially transformed data and then the row transform on each row of the block of partially transformed data. To simplify the description, we shall describe embodiments in the class that are configured to perform the 2D transform by performing the row transform on all rows of each block to generate a block of partially transformed data and then the column transform on each column of the block of partially transformed data. It should be understood that all references to "row" and "column" can be replaced by references to "column" and "row," respectively, to describe other embodiments in the class.

Herein, the term "subset" of a set (e.g., a row or column) of data values is used in a broad sense and can denote a row (or column) of data values, even elements of a row (or column) of data values, odd elements of a row (or column) of data values, every Nth data value in a row (or column) of data values, even elements of a row or column of data values in a bit-reversed order (suitable for FFT butterflies), or another subset of data values.

To implement the row transform, a system in the noted class includes circuitry configured to perform transformation operations (typically including multiplications and additions) on the input data values of each row of an input data block to generate a block of partially transformed data. The system typically includes a buffer in which the partially transformed data are stored. To implement the column transform, the system includes circuitry configured to perform transformation operations (typically including multiplications and additions) on the data values of each column of the block of partially transformed data. Each embodiment in the noted class is configured so that, when performing the row transform on each row of input data, it determines whether each of different subsets of the data values comprising a first partition of the row includes at least one zero value (e.g., consists of zero values), determines whether each of different subsets of a first subset of the first partition of the row includes at least one zero value, and determines whether each of different subsets of at least one other subset of the first partition of the row includes at least one zero value, and when performing the row transform on each said row that includes at least one zero input data value and at least one non-zero input data value, at least one transformation operation on at least one (and preferably on each) said zero input data value is bypassed or performed in a reduced-power manner, where such transformation operation would otherwise be performed in a manner consuming full power if the zero value were a non-zero value (e.g., at least one multiplication or addition is bypassed that would otherwise be performed using multiplication and addition circuitry). When implementing the row transform on each row that includes at least one zero input data value and at least one non-zero input data value, circuitry in some such embodiments for performing the transformation operation on the zero input value is operated without updating at least one of its inputs to avoid consuming power that would otherwise be consumed to toggle each such input.

Preferably, an embodiment in the noted class is also configured so that, when performing the column transform on each column of partially transformed data, it determines whether each of different subsets of the data values comprising a first partition of the column includes at least one zero value (e.g., consists of zero values), determines whether each of different subsets of a first subset of the first partition of the column includes at least one zero value, and determines whether each of different subsets of at least one other subset of the first partition of the column includes at least one zero value, and when performing the column transform on each said column that includes at least one zero value of the partially transformed data and at least one non-zero value of the partially transformed data, it bypasses (or performs in a reduced-power manner) at least one of the transformation operations that it would otherwise perform in a manner consuming full power on at least one (and preferably on each) said zero value of the partially transformed data value if said value were a non-zero value (e.g., at least one multiplication or addition that would otherwise be performed using multiplication and addition circuitry). For example, when implementing the column transform on each column that includes at least one zero data value and at least one non-zero data value, one such embodiment is configured to bypass a transformation operation on a zero value of the column that would otherwise be performed if the zero value were a non-zero value (e.g., the embodiment bypasses circuitry for performing the transformation operation).

Preferred embodiments of the invention determine whether each block of data to be transformed consists entirely of zero values. Upon determining that a block consists entirely of zero values, transformation operations (both row and column transform operations) on the values of the block are bypassed or performed in a reduced power manner. These preferred embodiments also sequentially (e.g., iteratively) determine whether each of a number of different subsets of each row or column of a block of data to be transformed includes at least one zero value. An example of such an embodiment will refer to a row (or column) of data consisting of values $x_i$, where i is an integer in the range $0 \le i \le N-1$, and N is an even integer, a partition of the row (or column) into a first subset of data values and a second subset of data values distinct from the first subset, a partition of the first subset into a third subset of data values and a fourth subset distinct from the third subset, and a partition of the second subset into a fifth subset of data values and a sixth subset distinct from the fifth subset. The exemplary embodiment determines whether the first subset consists entirely of zero values and whether the second subset consists entirely of zero values. Typically, where the row (or column) consists of cosine transform coefficients (generated by performing a DCT on frames of video data), the first subset consists of low frequency coefficients (values $x_i$, where i is an integer in the range $0 \le i \le (N/2)-1$), the second subset consists of high frequency coefficients (values $x_i$, where i is an integer in the range $N/2 \le i \le N-1$), and the second subset has a significant probability of consisting only of zero values (and has a much higher probability of consisting only of zero values than does the first subset).

The exemplary embodiment, upon determining that the first subset consists entirely of zero values, bypasses transformation operations on the values in the first subset or performs them in a reduced power manner (e.g., circuitry for performing these operations is bypassed, or the circuitry is operated with at least one of its inputs not being updated to avoid consuming power that would otherwise be consumed to toggle each such input). Upon determining that the second subset consists entirely of zero values, transformation operations on the values in the second subset are bypassed or performed in a reduced power manner.

Upon determining that each of the first subset and the second subset includes at least one non-zero value, the exemplary embodiment determines whether each of the third subset, the fourth subset, the fifth subset, and the sixth subset consists entirely of zero values. In a typical implementation in which the first subset consists of low frequency coefficients (values $x_i$, where i is an integer in the range $0 \le i \le (N/2)-1$), the second subset consists of high frequency coefficients (values $x_i$, where i is an integer in the range $N/2 \le i \le N-1$), the third subset consists of the even values of the first subset (values $x_i$, where i is an even integer in the range $0 \le i \le (N/2)-1$), the fourth subset consists of the odd values of the first subset (values $x_i$, where i is an odd integer in the range $0 \le i \le (N/2)-1$), the fifth subset consists of the even values of the second subset, and the sixth subset consists of the odd values of the second subset. For each of the third subset, the fourth subset, the fifth subset, and the sixth subset that is determined to consist entirely of zero values, transformation operations on the values of such subset are bypassed or performed in a reduced power manner (e.g., circuitry for performing these operations is bypassed, or the circuitry is operated without updating at least one of its inputs to avoid consuming power that would otherwise be consumed to toggle each such input). For each of the third subset, the fourth subset, the fifth subset, and the sixth subset that is determined to include at least one non-zero value, transformation operations are performed in a manner consuming full power on the values of such subset.

In variations on the above-described exemplary embodiment (and in other embodiments of the invention), data values comprising each row or column (or a subset of a row or column) of a block to be transformed are reordered prior to or during the determination as to whether each distinct subset comprising a partition of the row or column (or subset thereof) consists entirely of zero values (or is a zero value). For example, if a row consists of values $x_i$, where i is an integer in the range $0 \leq i \leq N-1$, where N is an even integer, the partition consists of distinct first and second subsets of the row, the first subset consists of distinct third and fourth subsets of the row, and the second subset consists of distinct fifth and sixth subsets of the row, the first subset consists of values $x_i$, where i is an integer in the range $0 \leq i \leq (N/2)-1$, the second subset consists of high frequency coefficients (values $x_i$, where i is an integer in the range $N/2 \leq i \leq N-1$), the third subset can consist of the values $x_i$, where i is in the range $0 \leq i \leq (N/4)-1$, which are even values of a reordered version of the first subset, the fourth subset can consist of the values $x_i$, where i is in the range $N/4 \leq i \leq (N/2)-1$, which are odd values of the reordered version of the first subset, the fifth subset can consist of the values $x_i$, where i is in the range $N/2 \leq i \leq (3N/4)-1$, which are even values of a reordered version of the second subset, and the sixth subset can consist of the values $x_i$, where i is in the range $3N/4 \leq i \leq N-1$, which are odd values of the reordered version of the second subset.

In another class of embodiments, the invention is a method for performing a 2D transform on a sequence of input data blocks, each of the blocks comprising rows and columns of input data values, and the 2D transform including a row transform and a column transform. In typical embodiments in the class, each block is a block of DCT coefficients that have been generated by performing a DCT on video data and the 2D transform is an inverse discrete cosine transform. In these typical embodiments and in other embodiments in the class, many or all of the blocks (e.g., at least substantially all of the blocks) in the sequence are blocks of sparse data. The 2D transform can include the steps of performing the row transform on all rows of each input data block to generate a block of partially transformed data and then performing the column transform on each column of the block of partially transformed data, or the steps of performing the column transform on all columns of each input data block to generate a block of partially transformed data and then performing the row transform on each row of the block of partially transformed data. To simplify the description, we shall describe embodiments in the class in which the 2D transform includes the steps of performing the row transform on all rows of each input data block to generate a block of partially transformed data and performing the column transform on each column of the block of partially transformed data. It should be understood that all references to "row" and "column" can be replaced by references to "column" and "row," respectively, to describe other embodiments in the class.

In some embodiments in the noted class, the method includes the steps of:

(a) performing the row transform on each row of one of the input data blocks, including by performing transformation operations on input data values of each said row, to generate a partially transformed data block; and (b) performing the column transform on each column of the partially transformed data block, including by performing additional transformation operations on data values of each said column, wherein step (a) includes the steps of:

determining whether each of different subsets of the data values comprising a first partition of each said row includes at least one zero value (e.g., consists of zero values), determining whether each of different subsets of a first subset of the first partition includes at least one zero value, and determining whether each of different subsets of at least one other subset of the first partition includes at least one zero value; and when performing the row transform on each said row that includes at least one zero input data value and at least one non-zero input data value, bypassing (or performing in a reduced power manner) at least one of the transformation operations that would otherwise be performed on at least one (and preferably on each) said zero input data value in a manner consuming full power if each said zero input value were a non-zero value (e.g., bypassing at least one multiplication or addition that would otherwise be performed using multiplication and addition circuitry on at least one (and preferably on each) said zero input data value of the row).

For example, when implementing the row transform on each row that includes at least one zero input data value and at least one non-zero input data value, step (a) includes the step of operating a multiplication circuit having a first input and a second input to perform a multiplication operation (in which the zero input value, asserted to the first input, is multiplied by a second value asserted to the second input) without updating the value asserted to the second input to avoid consuming power that would otherwise be consumed to toggle the second input.

Preferably, step (b) includes the steps of:

determining whether each of different subsets of the data values comprising a partition of each said column includes at least one zero value (e.g., consists of zero values), determining whether each of different subsets of a first subset of the partition includes at least one zero value, and determining whether each of different subsets of at least one other subset of the partition includes at least one zero value; and when performing the column transform on each said column that includes at least one zero input data value and at least one non-zero input data value, bypassing (or performing in a reduced power manner) at least one of the additional transformation operations that would otherwise be performed on at least one (and preferably on each) said zero input data value in a manner consuming full power if each said zero input value were a non-zero value (e.g., bypassing at least one multiplication or addition that would otherwise be performed using multiplication and addition circuitry on at least one (and preferably on each) said zero input data value of the column).

Advantages of transform circuitry implemented in accordance with typical embodiments of the present invention include:

improved (and preferably optimized) computation efficiency (which allows lower frequency of operation) due to avoidance of redundant or otherwise unnecessary computations or computation steps (e.g., the performance of typical embodiments of the inventive transform engine, in transforming blocks of input data values, directly scales with the number of non-zero input data values per block. This is at a finer level of granularity than for conventional transform engines whose performance, in transforming blocks of input data values, scales with the number of rows including at least one non-zero value per block);

reduced switching activity reduces power consumption;

provision of intelligent intermediate buffer memory management (in preferred embodiments); and faster performance of integer transforms by avoiding redundant or otherwise unnecessary computations or computation steps (e.g., avoiding unnecessary multiplier input toggling).

In some embodiments, the inventive system is a video processing system (e.g., a pipelined video decoding system) including a transform engine implemented in accordance with the invention. In some such embodiments, the video processing system is configured to be operable as a video processing subsystem of a portable media player. In other embodiments, the inventive system is a portable media player including a video processing subsystem that includes a transform engine implemented in accordance with the invention.

Other aspects of the invention are transform engines and transform engine circuitry for use in any embodiment of the inventive system, and methods performed during operation of any embodiment of the inventive system.

DETAILED DESCRIPTION OF PREFERRED EMBODIMENTS

Embodiments of the inventive system will be described with reference to FIGS. 1, 2, 3, 4, 5, and 6.

Figure 1:
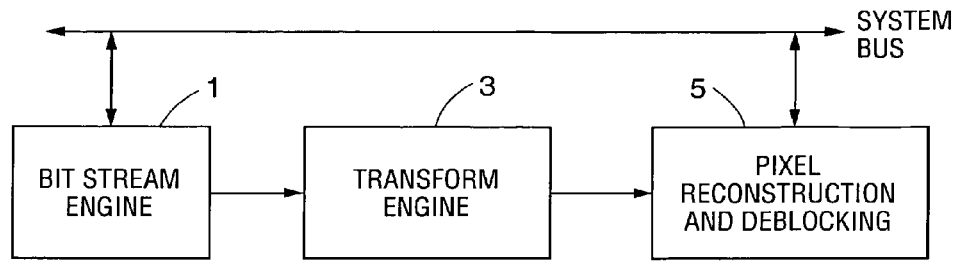
FIG. 1 is a block diagram of a pipelined video decoding system including a transform engine that can be implemented in accordance with embodiments of the present invention.

FIG. 1 is a system level block diagram of a pipelined video decoding system including bitstream engine 1, transform engine 3 (which can be implemented in accordance the present invention), and pixel reconstruction engine 5, connected along a system bus as shown. Bitstream engine 1 receives encoded video data that comprise processed blocks of frequency domain coefficients, said frequency domain coefficients having been generated by performing a 2D transform (e.g., a two-dimensional DCT) on blocks of video pixels. Bitstream engine 1 processes the encoded video data, typically by performing unpacking and inverse quantization thereon, and asserts the resulting sequence of blocks of processed frequency domain coefficients to transform engine 3. Transform engine 3 performs a 2D inverse transformation on each block of the sequence to generate blocks of partially decoded video pixels, and asserts the partially decoded video pixels to pixel reconstruction engine 5 for further video decoding. Pixel reconstruction engine 5 generates fully decoded pixels in response to the partially decoded video pixels, and asserts the fully decoded pixels to the system bus.

The system of FIG. 1 can be a subsystem of a portable media player or another portable data processing system (or a data processing system not intended to be portable) having video decoding capability, and such a subsystem can be implemented in accordance with the invention by implementing transform engine 3 in accordance with the invention. Such a processing system can and typically would include additional elements that are not shown in FIG. 1.

Figure 2:
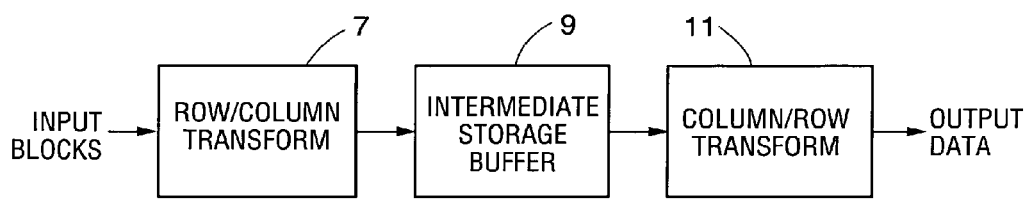
FIG. 2 is a block diagram of a processing system (having video decoding capability) that can be implemented in accordance with the invention.

It is contemplated that some embodiments of the invention are implemented by systems that do not have the structure shown in FIG. 1, or by processing systems that do not have the structure shown in FIG. 2.

FIG. 2 is a block diagram of a typical implementation of transform engine 3 of FIG. 1, or another apparatus for performing a two dimensional transform (e.g., a 2D inverse transform) on blocks of data values. FIG. 2 includes row/column transform circuitry 7, storage buffer 9, and column/row transform circuitry 11, connected as shown. In some implementations, circuitry 7 of FIG. 2 is configured to perform a row transform on all rows of each block of a sequence of blocks of input data received thereby and to assert the resulting data to storage buffer 9, and circuitry 11 is configured to read columns of such data from buffer 9 and to perform a column transform on all columns of each block of data resulting from the row transform. In other implementations, circuitry 7 of FIG. 2 is configured to perform a column transform on all columns of each block of a sequence of blocks of input data received thereby and to assert the resulting data to storage buffer 9, and circuitry 11 is configured to reads rows of such data from buffer 9 and to perform a row transform on all rows of each block of data resulting from the column transform.

Figure 3:
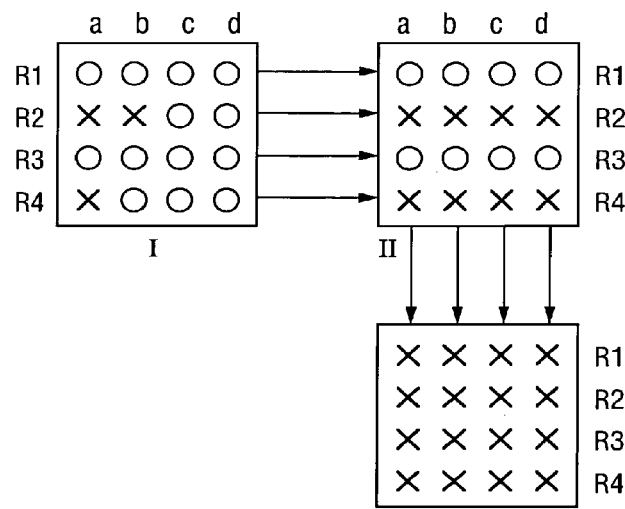
FIG. 3 is a diagram of an input data block, a version of the block that has undergone a row transform, and a version of the block that has undergone a row transform and a column transform.

FIG. 3 is a diagram of an input data block (labeled "I") of a type that can be input to circuitry 7 of an implementation of FIG. 2, a version (labeled block "II") of block I that has undergone a row transform (e.g., in circuitry 7 of such implementation of FIG. 2), and a version (labeled block "III") of block I that has undergone a row transform and a column transform (e.g., in circuitry 7 and circuitry 11 of such implementation of FIG. 2). Block I of FIG. 3 is a 4×4 block of frequency domain coefficients, comprising four rows and four columns of coefficients, with each coefficient having zero value labeled as "0" and each coefficient having non-zero value labeled as "X." The rows are identified by reference symbols "R1" through "R4" and the columns are identified by reference symbols "a" through "d."

A typical conventional transform engine is configured to identify full rows or columns (of each block to be transformed) that consist entirely of zero values (i.e., "zero-rows" or "zero-columns") and to bypass normal transform operations that would otherwise be performed on each identified zero-row or zero-column. Such a conventional transform engine would identify rows R1 and R3 of block I as zero-rows and bypass transform computations that it would otherwise perform on rows R1 and R3.

In contrast, a typical embodiment of the inventive transform engine (e.g., an implementation of the FIG. 2 engine that embodies the invention) is configured not only to identify zero-rows and zero-columns of each block to be transformed (e.g., rows R1 and R3 of block I), to bypass row transform computations that it would otherwise perform on a zero-row (if it did not identify the row as a zero-row), and to bypass column transform computations that it would otherwise perform on a zero-column (if it did not identify the column as a zero-column), but also to save additional power during transform operations on non-zero-rows and non-zero-columns (e.g., row transform computations on rows R2 and R4 of block I). The additional power saving is achieved by identifying subsets of rows (and subsets of columns) that consist entirely of zero data values (e.g., the subset of row R2 of block I that consists of the coefficients in columns c and d, or the subset of row R4 of block I that consists of the coefficients in columns b and d), and avoiding (or performing in a reduced-power manner) transform computations that would otherwise be performed on each such subset if the subset did not consist entirely of zero data values.

Consider the case that such an embodiment of the inventive transform engine has the structure shown in FIG. 2 and is configured to perform an IDCT (inverse DCT) transform on each block of a sequence of 4×4 blocks of DCT transform coefficients. Each row of each such block consists of two low frequency coefficients (e.g., those in columns "a" and "b" of each block in FIG. 3) and two high frequency coefficients (e.g., those in columns "c" and "d" of each block in FIG. 3). Each column of such a block consists of two low frequency coefficients (e.g., those in rows "R1" and "R2" of each block in FIG. 3) and two high frequency coefficients (e.g., those in rows "R3" and "R4" of each block in FIG. 3). In this case, higher frequency coefficients of each row and each column have a higher probability of consisting only of zero values than do the lower frequency coefficients.

Circuitry 7 of one such embodiment of the inventive transform engine is configured to determine whether the two lowest frequency coefficients of each row of each block of DCT transform coefficients consist entirely of zero values, to determine whether the two highest frequency coefficients of each such row consist entirely of zero values, to bypass row transform computations on the two lowest frequency coefficients of each row if they consist entirely of zero values (where such computations would otherwise be performed in a manner consuming full power on these coefficients if they did not consist entirely of zero values) or to perform such computations in a reduced-power manner, and to bypass row transform computations on the two highest frequency coefficients of each row if they consist entirely of zero values (where such computations would otherwise be performed in a manner consuming full power on these coefficients if they did not consist entirely of zero values) or to perform such computations in a reduced-power manner. For example, circuitry 7 of such embodiment can be configured to bypass row transform computations on the two highest frequency coefficients of each of rows R1, R2, R2, and R4 of block I.

Circuitry 7 of such embodiment of the inventive transform engine is also configured to determine whether the even coefficient of the two lowest frequency components of each row of each block of DCT transform coefficients asserted thereto (e.g., each coefficient in column "b" of block I of FIG. 3) is a zero value, to determine whether the odd coefficient of the two lowest frequency components of each row of each block of DCT transform coefficients asserted thereto (e.g., each coefficient in column "a" of block I of FIG. 3) is a zero value, to determine whether the even coefficient of the two highest frequency components of each row of each block of DCT transform coefficients asserted thereto (e.g., each coefficient in column "d" of block I of FIG. 3) is a zero value, and to determine whether the odd coefficient of the two highest frequency components of each row of each block of DCT transform coefficients asserted thereto (e.g., each coefficient in column "c" of block I of FIG. 3) is a zero value. Circuitry 7 of such embodiments is also configured to perform in a reduced-power manner a multiplication computation that would otherwise be performed (in a manner consuming more power) on each such coefficient that is determined to be a zero value to transform the row. Typically, each such reduced-power multiplication is performed by operating a multiplication circuit having a first input and a second input to multiply the zero value (asserted to the first input) by a second value (asserted to the second input) without updating the value asserted to the second input, thereby avoiding the consumption of power that would otherwise be consumed to toggle the second input in the case that value asserted to the first input were a non-zero value (and an updated second value at the second input needs to be multiplied by such non-zero value).

Circuitry 11 of such embodiment of the inventive transform engine is preferably also configured to determine whether the first half (i.e., the first two data values) of each column of each 4×4 block of partially transformed coefficients read from buffer 9 consists entirely of zero values, to determine whether the second half (the last two data values) of each such column consists entirely of zero values, to bypass column transform computations on the first half of each column if it consists entirely of zero values (where such computations would otherwise be performed in a manner consuming full power on these values if they did not consist entirely of zero values) or to perform such computations in a reduced-power manner, and to bypass column transform computations on the second half of each column if it consists entirely of zero values (where such computations would otherwise be performed in a full power manner on these values if they did not consist entirely of zero values) or to perform such computations in a reduced-power manner.

Circuitry 11 of such embodiment of the inventive transform engine is also configured to determine whether the even data value in the first half of each column of each of 4×4 block of partially transformed coefficients read from buffer 9 (e.g., each value in row R2 of block II of FIG. 3) is a zero value, to determine whether the odd data value in the first half of each such column (e.g., each coefficient in row R1 of block II of FIG. 3) is a zero value, to determine whether the even data value in the second half of each such column (e.g., each coefficient in row R4 of block II of FIG. 3) is a zero value, and to determine whether the odd data value in the second half of each such column (e.g., each coefficient in row R3 of block II of FIG. 3) is a zero value. Circuitry 11 of such embodiments is also configured to perform in a reduced-power manner a multiplication computation that would otherwise be performed (in a manner consuming more power) on each such data value that is determined to be a zero value to transform the column. Typically, each such reduced-power multiplication is performed by operating a multiplication circuit having a first input and a second input to multiply the zero value (asserted to the first input) by a second value (asserted to the second input) without updating the value asserted to the second input, thereby avoiding the consumption of power that would otherwise be consumed to toggle the second input in the case that value asserted to the first input were a non-zero value (and an updated second value at the second input needs to be multiplied by such non-zero value).

In variations on the above example in which each row and column comprises 8 data values, each step of determining whether the odd (or even) data value in the first (or second) half of a row (or column) is a zero value, is replaced by a step of determining whether the data values in the first (or second) half of said half of the row (or column) consist entirely of zero values, and the engine is configured to bypass row (or column) transform computations on each half of each half row (or half column) consisting entirely of zero values (where such computations would otherwise be performed in a full power manner on these values if they did not consist entirely of zero values) or to perform such computations in a reduced-power manner. Preferably, the engine is also configured to determine whether the odd data value in each such half row (or half column) is a zero value, to determine whether the even data value of each such half row (or half column) is a zero value, and to perform in a reduced-power manner a multiplication computation that would otherwise be performed (in a manner consuming more power) on each such data value that is determined to be a zero value to transform the relevant row or column.

In variations on either above-described example, data values comprising each row or column (or a subset of a row or column) of a block to be transformed by circuitry 7 or 11 are reordered prior to or during the determination as to whether each distinct subset comprising a partition of the row or column (or subset thereof) consists entirely of zero values (or is a zero value). For example, if a row (or column) consists of values $x_i$, where i is an integer in the range $0 \le i \le N-1$, where N is an even integer, the partition consists of distinct first and second subsets of the row (column), the first subset consists of distinct third and fourth subsets of the row (column), and the second subset consists of distinct fifth and sixth subsets of the row (column), the first subset consists of values $x_i$, where i is an integer in the range $0 \le i \le (N/2)-1$), the second subset consists of values $x_i$, where i is an integer in the range $N/2 \le i \le N-1$, the third subset can consist of the values $x_i$, where i is in the range $0 \le i \le (N/4)-1$), or it can consist of the even values of the first subset, or it can consist of the even values of a reordered version of the first subset, the fourth subset can consist of the values $x_i$, where i is in the range $N/4 \le i \le (N/2)-1$), or it can consist of the odd values of the first subset, or it can consist of the odd values of a reordered version of the first subset, the fifth subset can consist of the values $x_i$, where i is in the range $N/2 \le i \le (3N/4)-1$), or it can consist of the even values of the second subset, or it can consist of the even values of a reordered version of the second subset, and the sixth subset can consist of the values $x_i$, where i is in the range $3N/4 \le i \le N-1$), or it can consist of the odd values of the second subset, or it can consist of the odd values of a reordered version of the second subset.

With reference again to row R4 of block I of FIG. 3, the even coefficients in such row R4 are zero values and the odd coefficients in such row do not consist entirely of zero values. To transform such row R4, some embodiments of the inventive transform engine would reduce power consumption by preventing the inputs to the multipliers that perform row transform operations on the even coefficients of the row from toggling during the performance of such row transform operations. This helps to reduce the switching power that is consumed by the multipliers during the transform (i.e., to reduce dynamic power consumption).

With reference again to FIG. 3, in row R4 of block I, only the first coefficient in the entire row is a non-zero (coded) coefficient. Preferred embodiments of the inventive transform engine are configured to recognize a row or column of this type (i.e., one in which only the first data value is non-zero) and to transform such a row or column in a manner consuming less power than would be required to transform a row or column consisting entirely of non-zero values. For example, preferred implementations of circuitry 7 (of an embodiment of the inventive transform engine having the structure shown in FIG. 2) are configured to perform a row transform on an input data row of which only the first value is non-zero in a reduced-power manner, in response only to the non-zero coefficient of the row and without performing a normal row transform on all data values of the row (which would consume full power), and to store in buffer 9 the resulting partially transformed data values.

Preferred embodiments of the inventive transform engine reduce power consumption by detecting whether individual data values of a block to be transformed (e.g., performing zero-detection on individual coefficients of a block of DCT coefficients to undergo an inverse direct cosine transform, on a coefficient by coefficient basis), and for all data values that are determined to be zero values, ensuring that at least one (and preferably each) input to at least one multiplier to be employed to transform at least one said zero value does not switch from its earlier value. This reduces dynamic power consumption in the engine.

In preferred implementations of an embodiment of the inventive transform engine having the structure shown in FIG. 2, circuitry 7 stores in internal buffer 9 the partially transformed data value generated thereby. Circuitry 11 reads this data from buffer 9 and performs a column (or row) transform on each column (or row) of the data. Typically, circuitry 11 can perform a column (row) transform computation as soon as there is at least one column (row) of data in buffer 9 and available for transform. Thus, in preferred embodiments, circuitry 7 is configured to reorder the row (column) transform operations that it performs to generate (and store in buffer 9) as rapidly as possibly just enough partially transformed data for circuitry 11 to perform a column (row) transform on a complete column (row) of the data. By configuring circuitry 7 to perform the row (column) transform in such a reordered (e.g., interleaved) manner, power consumption by the system can be reduced (e.g., by minimizing power consumed for internal buffer storage).

Alternatively, when a symmetric transform being performed in accordance with an embodiment of the inventive transform engine having the structure shown in FIG. 2, circuitry 7 is configured, in a manner that exploits the symmetric nature of the transform, to perform row transform computations sufficient to generate (and store in buffer 9) two columns of data before performing additional row transform computations, or to perform enough column transform computations to generate (and store in buffer 9) two rows of data before performing additional column transform computations. The row (or column) transform performed by such embodiment of circuitry 7 proceeds to generate (and store in buffer 9) as rapidly as possibly just enough partially transformed data for circuitry 11 to perform a column (row) transform on additional complete columns (row) of the buffered data. The decision as to whether to implement circuitry 7 to perform row transform computations to so as to output one column of data, or two columns of data, before performing additional row transform computations, depends on a tradeoff between performance and buffer memory requirements. It should be appreciated that if circuitry 7 is implemented to perform a row transform in such a manner that buffer 9 need only have capacity to store one column of partially transformed data, the advantage of minimizing the required capacity of buffer 9 would typically come at the cost of reduced performance (e.g., increased number of cycles for the inventive transform engine to perform an inverse transform on a complete block of data values).

In order to perform a conventional H264 based transform (an integer transform that can be performed without real multiplication) in accordance with the invention, the inventive transform engine can be implemented without multipliers. The H264 based transform can be implemented using shifters rather than multipliers. Bypassing transform circuitry in accordance with the invention can speed up the transform computations (and reduce the energy consumed thereby) even in these implementations.

Figure 4:
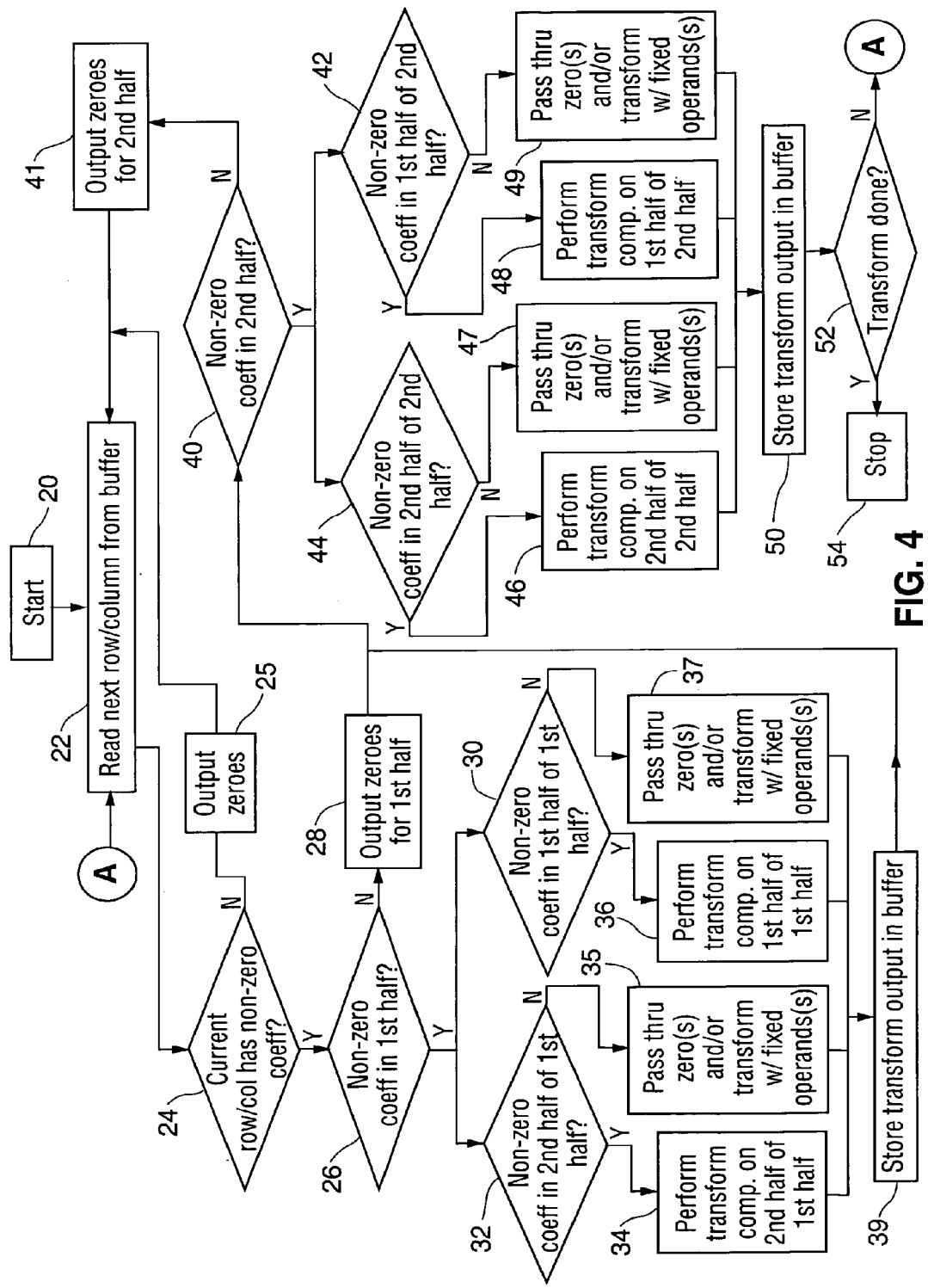
FIG. 4 is a flow chart of steps of an embodiment of the inventive method (which can be performed by a class of embodiments of the inventive system).

We next describe a class of embodiments of the invention in more detail with reference to the flow chart of FIG. 4. The flow chart of FIG. 4 pertains to a 2D transform (e.g., an inverse discrete cosine transform) performed on each block of a sequence of input data blocks, where each block comprises rows and columns of input data values, and the 2D transform includes a row transform and a column transform. In accordance with the invention, the 2D transform is performed either by performing the row transform on all rows of each block to generate a block of partially transformed data and then the column transform on each column of the block of partially transformed data, or by performing the column transform on all columns of each block to generate a block of partially transformed data and then the row transform on each row of the block of partially transformed data. The flow chart of FIG. 4 describes such a row transform on rows of data values or such a column transform on columns of data values (e.g., it describes transformation of rows or columns of frequency coefficients by an implementation of circuitry 7 of FIG. 2 that embodies the invention, or transformation of rows or columns of partially transformed data values read from buffer 9 by an implementation of circuitry 11 of FIG. 2 that embodies the invention). For simplicity, the following description of FIG. 4 will assume that rows of data values are being transformed. It should be understood that all references to "row" in the description can be replaced by references to "column" to describe other embodiments of the invention.

A typical block to be inverse transformed in accordance with the invention has four coefficients per row (e.g., if the inverse transform is an H264 based transform) or eight coefficients per row (e.g., if the inverse transform is an IDCT on 8×8 blocks of frequency coefficients). FIG. 4 is applicable in either case.

Before performing the steps shown in FIG. 4, the transform engine of typical embodiments of the invention determines whether a block of data to be transformed consists entirely of zero values. Upon determining that the block consists entirely of zero values, the transform engine causes transformation operations (both row and column transform operations) on the block to be bypassed (e.g., it outputs zeroes in response to the block without performing actual transformation operations on the values of the block). If the transform engine determines that a block of data to be transformed includes at least one non-zero value, it initiates a row transform (i.e., it performs step 20 of FIG. 4).

Upon initiation (step 20) of a row transform to be performed in accordance with the FIG. 4 flow chart, a first row of data values to be transformed is read (in step 22) from a buffer memory. The buffer memory can either be one coupled to an input of circuitry 7 of FIG. 2 (if circuitry 7 implements the FIG. 4 flow chart) or it can be buffer memory 9 of FIG. 2 (if circuitry 11 implements the FIG. 4 flow chart).

In step 24, the transform engine determines whether the current row (the row read during the most recent performance of step 22) includes at least one non-zero value. If not, the transform engine outputs zeroes (step 25) indicative of a row transformed version of the row (without performing actual row transform computations on the data values of the row) and reads the next row from the buffer memory (the next performance of step 22). If the current row includes at least one non-zero value, the engine determines (in step 26) whether the first half of the current row (e.g., the first two data values of a row consisting of four data values) includes at least one non-zero value.

If the first half of the current row does not include at least one non-zero value, the engine outputs zeroes (step 28) indicative of a row transformed version of the first half of the row (without performing actual row transform computations on the data values of the first half of the row) and determines (in step 40) whether the second half of the current row (e.g., the second two data values of a row consisting of four data values) includes at least one non-zero value.

If the first half of the current row includes at least one non-zero value, the engine determines (in step 30) whether the first half of the first half of the current row includes at least one non-zero value and determines (in step 32) whether the second half of the first half of the current row includes at least one non-zero value.

If the first half of the current row's first half includes at least one non-zero value (e.g., if it consists of a single non-zero value, or consists of two values including at least one non-zero value), the engine performs (in step 36) row transform computations on the data values of the first half of the first half of the row and stores (in step 39) the resulting transformed data in a buffer memory. The buffer memory employed to perform step 39 can either be a buffer memory coupled to an output of circuitry 11 of FIG. 2 (if circuitry 11 implements the FIG. 4 flow chart) or buffer memory 9 of FIG. 2 (if circuitry 7 implements the FIG. 4 flow chart).

If the first half of the current row's first half does not include a non-zero value, the engine performs step 37 in which it:

(a) outputs one or more zeroes indicative of a row transformed version of the first half of the current row's first half (without performing actual row transform computations on the data value or values of the first half of the current row's first half). Each such zero value is then stored (in step 39) in a buffer memory; or (b) outputs at least one data value generated by performing row transform computations in a reduced-power manner on the data value(s) of the first half of the current row's first half. Each such output value is then stored (in step 39) in a buffer memory. For example, the engine can do this by operating multiplication circuitry having a first input set (comprising at least one input) to which at least one constant is asserted and a second input set (comprising at least one input) to which each data value of the first half of the current row's first half is asserted, to perform at least multiplication operation on each data value of the first half of the current row's first half without updating the value asserted to at least one of the first input set and the second input set, to avoid consuming power that would otherwise be consumed to toggle the relevant input(s) of the multiplication circuitry. In the case that the engine is performing an IDCT, each constant asserted to the first input set is a cosine constant, and in one implementation, whenever a data value asserted to the second input set is a zero value the engine prevents the cosine constant to be multiplied with said zero value from being updated (changed from its previous value) since the result of the multiplication would be a zero regardless of the cosine constant's value. In another implementation, the engine prevents the updating of a cosine constant asserted to the first input set (to be multiplied with a zero data value) and prevents the updating of the data value being asserted to the corresponding input of the second input set (to prevent toggling of either multiplier input), and asserts a zero value (e.g., multiplexes a zero value into output of the processing pipeline) indicative of the result of multiplying the zero data value with the cosine constant (without actually multiplying together these two operands); or (c) outputs one or more zeroes indicative of a row transformed version of at least one value in the first half of the current row's first half (without performing actual row transform computations on such data value or values), and outputs at least one data value generated by performing row transform computations in a reduced-power manner on at least one other data value of the first half of the current row's first half. Each such zero value and output value is then stored (in step 39) in a buffer memory.

If the second half of the current row's first half includes at least one non-zero value (e.g., if it consists of a single non-zero value or consists of two values including at least one non-zero value), the engine performs (in step 34) row transform computations on the data values of the second half of the first half of the row and stores (in step 39) the resulting transformed data in a buffer memory.

If the second half of the current row's first half does not include a non-zero value, the engine performs step 35 in which it:

(a) outputs one or more zeroes indicative of a row transformed version of the second half of the current row's first half (without performing actual row transform computations on the data value or values of the second half of the current row's first half). Each such zero value is then stored (in step 39) in a buffer memory; or (b) outputs at least one data value generated by performing row transform computations in a reduced-power manner on the data value(s) of the second half of the current row's first half. Each such output value is then stored (in step 39) in a buffer memory. For example, the engine can do this by operating multiplication circuitry having a first input set (comprising at least one input) to which at least one constant is asserted and a second input set (comprising at least one input) to which each data value of the second half of the current row's first half is asserted, to perform at least multiplication operation on each data value of the second half of the current row's first half without updating the value asserted to at least one of the first input set and the second input set, to avoid consuming power that would otherwise be consumed to toggle the relevant input(s) of the multiplication circuitry. In the case that the engine is performing an IDCT, each constant asserted to the first input set is a cosine constant, and in one implementation, whenever a data value asserted to the second input set is a zero value the engine prevents the cosine constant to be multiplied with said zero value from being updated (changed from its previous value) since the result of the multiplication would be a zero regardless of the cosine constant's value. In another implementation, the engine prevents the updating of a cosine constant asserted to the first input set (to be multiplied with a zero data value) and prevents the updating of the data value being asserted to the corresponding input of the second input set (to prevent toggling of either multiplier input), and asserts a zero value (e.g., multiplexes a zero value into the output of the processing pipeline) indicative of the result of multiplying the zero data value with the cosine constant (without actually multiplying together these two operands); or (c) outputs one or more zeroes indicative of a row transformed version of at least one value in the second half of the current row's first half (without performing actual row transform computations on such data value or values), and outputs at least one data value generated by performing row transform computations in a reduced-power manner on at least one other data value of the second half of the current row's first half. Each such zero value and output value is then stored (in step 39) in a buffer memory.

After all data values generated or asserted in steps 34 and 36, steps 34 and 37, steps 35 and 36, or steps 35 and 37 have been stored (step 39) in the buffer memory, the engine determines (in step 40) whether the second half of the current row includes at least one non-zero value. If the second half of the current row does not include at least one non-zero value, the engine outputs zeroes (step 41) indicative of a row transformed version of the second half of the row (without performing actual row transform computations on the data values of said second half of the row) and reads the next row to be transformed from buffer memory (another performance of step 22).

If the second half of the current row includes at least one non-zero value, the engine determines (in step 42) whether the first half of the second half of the current row includes at least one non-zero value and determines (in step 44) whether the second half of the second half of the current row includes at least one non-zero value.

If the first half of the second half of the current row includes at least one non-zero value (e.g., if it consists of a single non-zero value, or consists of two values including at least one non-zero value), the engine performs (in step 48) row transform computations on the data values of the first half of the second half of the row and stores (in step 50) the resulting transformed data in a buffer memory. The buffer memory employed to perform step 50 can either be a buffer memory coupled to an output of circuitry 11 of FIG. 2 (if circuitry 11 implements the FIG. 4 flow chart) or buffer memory 9 of FIG. 2 (if circuitry 7 implements the FIG. 4 flow chart).

If the first half of the current row's second half does not include a non-zero value, the engine performs step 49 in which it:

(a) outputs one or more zeroes indicative of a row transformed version of the first half of the current row's second half (without performing actual row transform computations on the data value or values of the first half of the current row's second half). Each such zero value is then stored (in step 50) in a buffer memory; or (b) outputs at least one data value generated by performing row transform computations in a reduced-power manner on the data value(s) of the first half of the current row's second half. Each such output value is then stored (in step 50) in a buffer memory. For example, the engine can do this by operating multiplication circuitry having a first input set (comprising at least one input) to which at least one constant is asserted and a second input set (comprising at least one input) to which each data value of the first half of the current row's second half is asserted, to perform at least multiplication operation on each data value of the first half of the current row's second half without updating the value asserted to at least one of the first input set and the second input set, to avoid consuming power that would otherwise be consumed to toggle the relevant input(s) of the multiplication circuitry. In the case that the engine is performing an IDCT, each constant asserted to the first input set is a cosine constant, and in one implementation, whenever a data value asserted to the second input set is a zero value the engine prevents the cosine constant to be multiplied with said zero value from being updated (changed from its previous value) since the result of the multiplication would be a zero regardless of the cosine constant's value. In another implementation, the engine prevents the updating of a cosine constant asserted to the first input set (to be multiplied with a zero data value) and prevents the updating of the data value being asserted to the corresponding input of the second input set (to prevent toggling of either multiplier input), and asserts a zero value (e.g., multiplexes a zero value into the output of the processing pipeline) indicative of the result of multiplying the zero data value with the cosine constant (without actually multiplying together these two operands); or (c) outputs one or more zeroes indicative of a row transformed version of at least one value in the first half of the current row's second half (without performing actual row transform computations on such data value or values), and outputs at least one data value generated by performing row transform computations in a reduced-power manner on at least one other data value of the first half of the current row's second half. Each such zero value and output value is then stored (in step 50) in a buffer memory.

If the second half of the second half of the current row includes at least one non-zero value (e.g., if it consists of a single non-zero value, or consists of two values including at least one non-zero value), the engine performs (in step 46) row transform computations on the data values of the second half of the second half of the row and stores (in step 50) the resulting transformed data in a buffer memory.

If the second half of the current row's second half does not include a non-zero value, the engine performs step 47 in which it:

(a) outputs one or more zeroes indicative of a row transformed version of the second half of the current row's second half (without performing actual row transform computations on the data value or values of the second half of the current row's second half). Each such zero value is then stored (in step 50) in a buffer memory; or (b) outputs at least one data value generated by performing row transform computations in a reduced-power manner on the data value(s) of the second half of the current row's second half. Each such output value is then stored (in step 50) in a buffer memory. For example, the engine can do this by operating multiplication circuitry having a first input set (comprising at least one input) to which at least one constant is asserted and a second input set (comprising at least one input) to which each data value of the second half of the current row's second half is asserted, to perform at least multiplication operation on each data value of the second half of the current row's second half without updating the value asserted to at least one of the first input set and the second input set, to avoid consuming power that would otherwise be consumed to toggle the relevant input(s) of the multiplication circuitry. In the case that the engine is performing an IDCT, each constant asserted to the first input set is a cosine constant, and in one implementation, whenever a data value asserted to the second input set is a zero value the engine prevents the cosine constant to be multiplied with said zero value from being updated (changed from its previous value) since the result of the multiplication would be a zero regardless of the cosine constant's value. In another implementation, the engine prevents the updating of a cosine constant asserted to the first input set (to be multiplied with a zero data value) and prevents the updating of the data value being asserted to the corresponding input of the second input set (to prevent toggling of either multiplier input), and asserts a zero value (e.g., multiplexes a zero value into the output of the processing pipeline) indicative of the result of multiplying the zero data value with the cosine constant (without actually multiplying together these two operands); or (c) outputs one or more zeroes indicative of a row transformed version of at least one value in the second half of the current row's second half (without performing actual row transform computations on such data value or values), and outputs at least one data value generated by performing row transform computations in a reduced-power manner on at least one other data value of the second half of the current row's second half. Each such zero value and output value is then stored (in step 50) in a buffer memory.

After all data values generated or asserted in steps 46 and 48, steps 46 and 49, steps 47 and 48, or steps 47 and 49 have been stored (step 50) in the buffer memory, the engine determines (step 52) whether the row transform has been performed on all rows of the current block. If the row transform has been performed on all rows of the current block, the engine enters a state (step 54) in which it stops row transform operations. It can then perform step 20 again to begin processing of the next block of data values to be transformed. If the row transform has not been performed on all rows of the current block, the engine reads the next row (of the current block to be transformed) from buffer memory (another performance of step 22).

Figure 5:
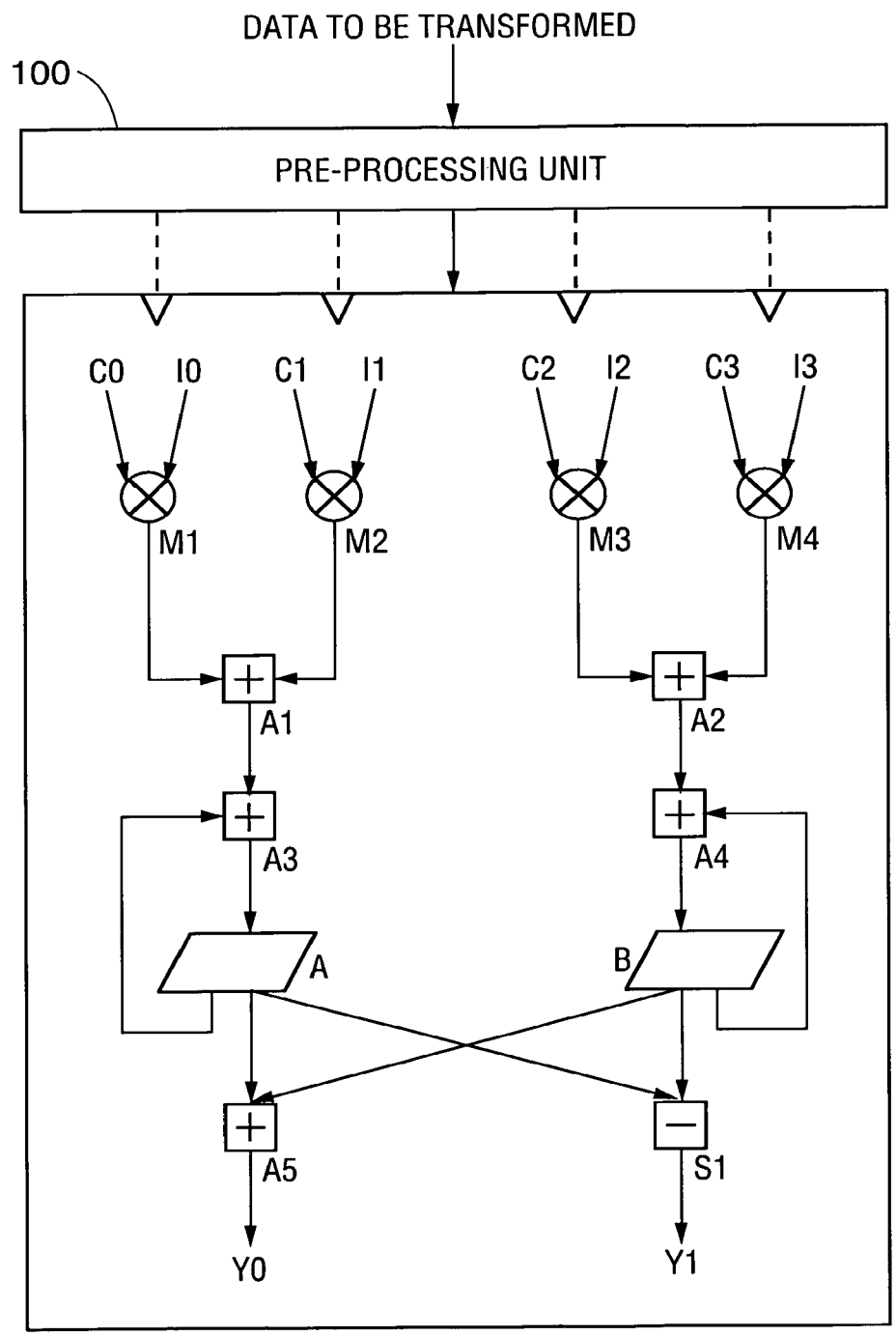
FIG. 5 is a block diagram of transform circuitry employed in a typical implementation of circuitry 7 (or circuitry 11) of FIG. 2 that embodies the invention.

FIG. 5 is a block diagram of transform circuitry employed in a typical implementation of circuitry 7 (or circuitry 11) of FIG. 2 that embodies the invention. Implementations of circuitry 7 (or 11) designed to transform 4×4 blocks of data would typically include one unit of the FIG. 5 circuitry, for transforming the four data values I0, I1, I2, and I3 of each row or column to be transformed. Implementations of circuitry 7 (or 11) designed to transform 8×8 blocks of data would typically include two units of the FIG. 5 circuitry: one for transforming the four data values I0, I1, I2, and I3 of the first half of each row or column to be transformed; and an identical one for transforming the four data values (I4, I5, I6, and I7) of the second half of each row or column to be transformed (using a second set of cosine constants C4, C5, C6, and C7 in place of the constants C0, C1, C2, and C3 shown in FIG. 5).

Each of multiplication units M1, M2, M3, and M4 of FIG. 5 includes a first input (to which one of cosine constants C0, C1, C2, and C3 is asserted), a second input (to which one of data values I0, I1, I2, and I3) is asserted, and an output at which it asserts a data value indicative of the product of the two operands. The FIG. 5 circuit also includes preprocessing and control logic 100 (to be referred to as preprocessing logic 100), addition circuits A1, A2, A3, A4, and A5, subtraction circuit S1, and delay circuits A and B (implemented as flip-flops), connected as shown, and is configured to perform a pipelined row transform or column transform on each set of four input values asserted thereto, to generate an output value Y0 (or Y1) in response each input value. During operation, delay circuit A typically delays, by one cycle of the pipelined transform, assertion of the output of addition circuit A3 to each selected one (as determined by control signals asserted by logic 100) of addition circuit A5, subtraction circuit S1, and addition circuit A3. During operation, delay circuit B typically delays, by one cycle of the pipelined transform, assertion of the output of addition circuit A4 to each selected one (as determined by control signals asserted by logic 100) of addition circuit A5, subtraction circuit S1, and addition circuit A4.

When the FIG. 5 circuitry is included in an implementation of circuitry 7 (or 11) that is designed to transform 4×4 blocks of data, preprocessing logic 100 is configured to perform the zero (or non-zero) value determination operations of FIG. 4. When two units of the FIG. 5 circuitry are included in an implementation of circuitry 7 (or 11) designed to transform 8×8 blocks of data, each of the units 100 is configured to perform the zero (or non-zero) value determination operations of FIG. 4 on a different subset (e.g., half) of each row or column of data values to be transformed. In any implementation of circuitry 7 (or 11), preprocessing logic 100 is configured to read input data values to be transformed from the relevant buffer memory (e.g., buffer 9 of FIG. 2 or a buffer memory coupled to the input of circuitry 7 of FIG. 2) and to generate (and assert to the appropriate ones of the other elements of FIG. 5) control signals needed to implement the other operations required by FIG. 4. For example, if logic 100 determines that coefficient I0 is a zero value (e.g., during step 30 of FIG. 4), it may assert a control signal to cause the coefficient C0 that was asserted to multiplier M1 during the previous operating cycle to continue to be asserted to multiplier M1 during each subsequent cycle in which multiplier M1 is to multiply the zero-valued coefficient I0 by a constant.

In a typical implementation, preprocessing logic 100 resets the output values Y0 and Y1 to zero upon receiving (e.g., from buffer 9) each set of four new input data values to be transformed. In this case, when preprocessing logic 100 determines that a zero value should be output (i.e., a zero value of Y0 or Y1) in response to one of the input values (e.g., in step 25, 28, 41, 35, 37, 47, or 49 of FIG. 4), it may prevent all toggling of inputs of circuit elements M1, M2, M3, M4, A1, A2, A3, A4, A, B, A5, and S1 during the cycle(s) in which these elements would otherwise operate to transform this input value, and instead cause the reset zero value of Y0 (or Y1) to be asserted to the relevant buffer (e.g., to buffer memory 9 or a buffer memory coupled to the output of circuitry 11).

In embodiments which require reordering of data values to be transformed, preprocessing unit 100 is preferably configured to perform such reordering. For example, to perform transforms similar to that described with reference to FIG. 4 but in which each step of determining whether data values in a first (or second) half of a half row or half column (or half of a half row or half column) include at least one non-zero value, is replaced by a step of determining whether the even (or odd) data values in a half row or half column (or half of a half row or half column) include at least one non-zero value, preprocessing unit 100 could reorder the data values to be assessed in order to perform the required determination. For example, unit 100 could determine whether data values in a first (or second) half of a reordered half row or reordered half column (or half of a reordered half row or reordered half column) include at least one non-zero value, thereby determining whether the even (or odd) data values in a non-reordered version of the half row or half column (or half of a non-reordered version of a half row or half column) include at least one non-zero value. It is contemplated that some implementations of preprocessing unit 100 may perform reordering of subsets of rows or columns (or partial rows or partial columns) that are not half rows (or half partial rows) or half columns (or half partial columns).

Figure 6:
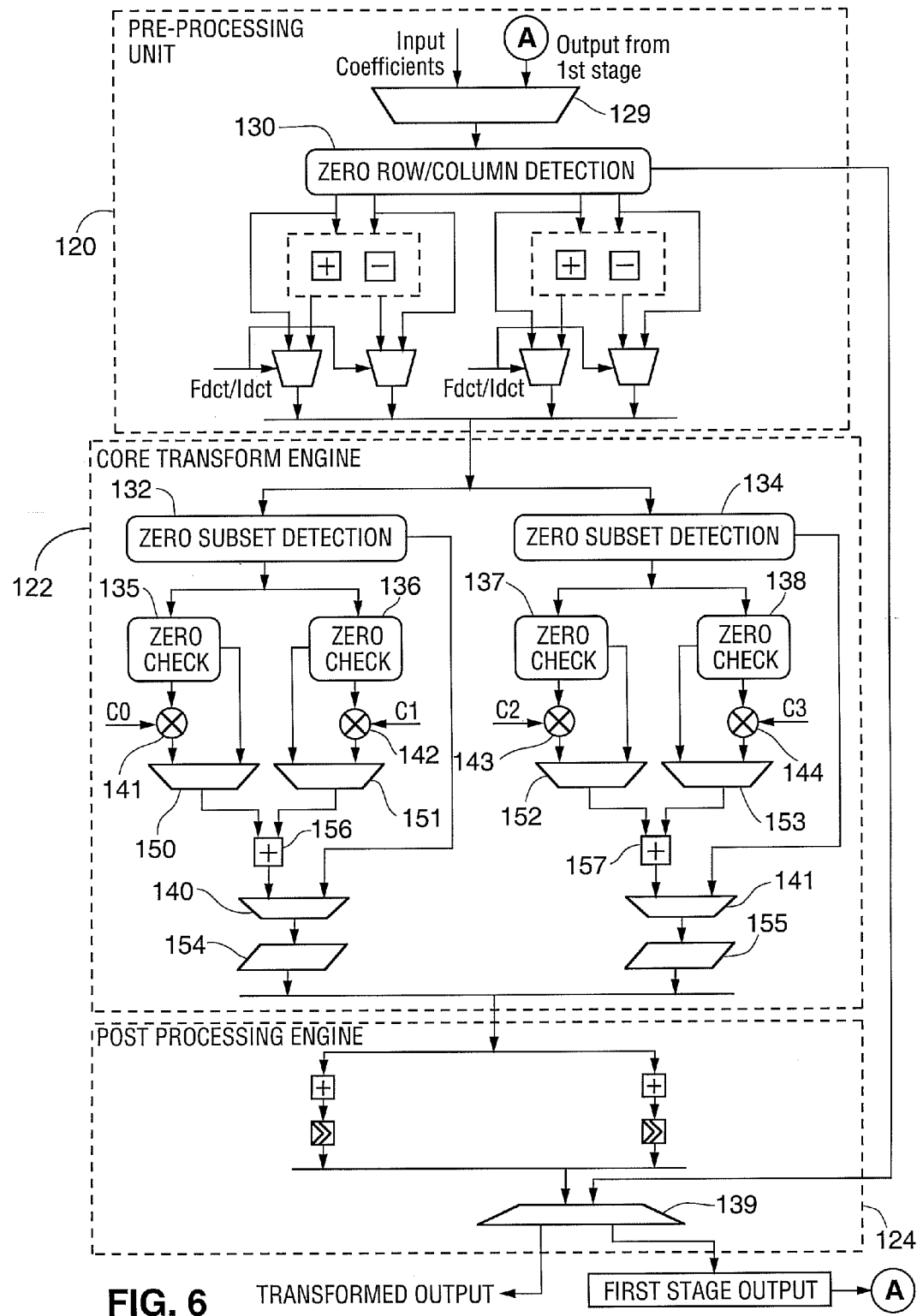
FIG. 6 is a block diagram of elements of an embodiment of the inventive pipelined video decoding system.

FIG. 6 is a block diagram of elements of an embodiment of the inventive pipelined video decoding system. Numerous variations on the design shown in FIG. 6 are contemplated for implementation in other embodiments of the invention (e.g., zero detection circuitry 132, 134, and 135-138 can be omitted and its functions performed by zero detection circuitry 130 or other zero detection circuitry). The system of FIG. 6 includes pre-processing unit 120, transform engine 122, and post-processing unit 124, connected as shown.

Unit 120 is coupled to receive a sequence of blocks of input data values (e.g., input frequency domain coefficients that have been generated by performing a two-dimensional DCT or inverse DCT or other 2D transform on blocks of video pixels). Unit 120 is also coupled to receive data values (identified in FIG. 6 as "output from 1st stage" and "first stage output") output from post-processing unit 124 after a first pass through the FIG. 6 system so that these data values (which are optionally buffered in a buffer memory after output from unit 124 and before assertion to unit 120) can undergo a second stage of processing during a second pass through the FIG. 6 circuitry (e.g., to perform a row transform on rows of the data values when columns of the data values have undergone a column transform during a first pass through the FIG. 6 circuitry).

Multiplexer 129 of unit 120 selects either input data values (that have not undergone processing in FIG. 6) or data values output from post-processing unit 124 (that have undergone processing in a previous pass through the FIG. 6 system) and asserts the selected values to zero detection logic 130. The selected values are passed through zero detection logic 130 (except, optionally, when logic 130 determines that they consist entirely of zero values). Optionally then, other circuitry within unit 120 performs preliminary processing operations on the values passed through logic 130 to generate preprocessed data values (these operations are performed when required to implement a particular transform to be implemented using the FIG. 6 system). Unit 120 asserts the preprocessed data values (which are identical to the output of logic 130 if no preliminary processing is performed on the output of logic 130) to transform engine 122.

Preprocessing unit 120 is typically configured to separate each set of data values asserted thereto into subsets appropriate for engine 122 to perform the transform to be implemented. The manner in which unit 120 accomplishes the separation into subsets will depend on the transform to be implemented (e.g., 8×8 DCT, 8×8 IDCT, or 8×8 Hadamard), and can be determined by control signals asserted to unit 120 from an external unit so that the subset selection can be customized on the basis of the transform to be implemented.

Transform engine 122 performs a 2D transform on each block of data values that it receives from unit 120 to generate blocks of transformed data values (e.g., blocks of partially decoded video pixels), and asserts the transformed data values to post-processing unit 124 for optional further processing. More specifically, transform engine 122 is configured to perform a pipelined row transform or column transform on each set of four data values asserted thereto from unit 120 to generate an output value in response each of these four data values. Each such set of four data values is typically a row (or column) of a block of data values, or a subset of a row (or column) of a block of data values.

Post-processing unit 124 optionally (i.e., when appropriate for the particular transform being performed by the FIG. 6 system) performs post-processing operations on the transformed values received from engine 122 to generate output data values. The output data values may be asserted from unit 124 to a system bus and/or fed back to at least one input of unit 120 (or to a buffer memory from which they are asserted to at least one input of unit 120). Typically, unit 124 performs rounding, saturation, and final packing (if necessary). The specific post-processing operations performed by unit 124 depend on whether the FIG. 6 circuit is implementing first stage or second stage processing on the input to unit 122.

Transform engine 122 of FIG. 6 is designed to transform 4×4 blocks of data, including by transforming four data values (I0, I1, I2, and I3) of each row or column to be transformed using a set of constants C0, C1, C2, and C3. In some other embodiments of the invention, circuitry for transforming 8×8 blocks of data would include two transform engines 122: one engine for transforming four data values I0, I1, I2, and I3 of a first subset (e.g., the first half) of each row or column to be transformed; and an identical engine for transforming four data values (I4, I5, I6, and I7) of a second subset (e.g., the second half) of each row or column to be transformed (using a second set of constants C4, C5, C6, and C7 in place of the constants C0, C1, C2, and C3 shown in block 122 of FIG. 6). The constants (e.g., C0, C1, C2, and C3) to be employed can be determined by control signals asserted to engine 122 from an external unit so that the choice of constants can be customized on the basis of the transform to be performed.

Typically, zero detection logic 130 of preprocessing unit 120 is configured to determine whether an entire block of data to be transformed consists (all four rows or columns of a 4×4 block of data to be transformed consist) entirely of zero values. For example, it may include a shift register providing sufficient latency to perform such a determination on all rows (columns) of a block before passing the first row (column) of the block to downstream circuitry. Upon determining that the block consists entirely of zero values, logic 130 asserts appropriate control bits to other elements of the FIG. 6 system that cause bypassing (e.g., as described above) of transformation operations that would otherwise be performed subsequently on the block by engine 122, and typically also cause predetermined values (e.g., zeroes) to be output from multiplexer 139 of unit 124 in response to the block without performance of actual transformation operations by one or both of engine 122 and unit 124 on the values of the block.

Whether or not zero detection logic 130 of preprocessing unit 120 is configured to determine whether an entire block of data consists entirely of zero values as described in the previous paragraph, logic 130 is configured to perform zero detection on the data values of each individual row (or column) asserted to logic 130 from multiplexer 129 to determine whether all data values of such a row (or column) are zero values (i.e., it performs step 24 of FIG. 4). When each such row (or column) consists of four data values, logic 130 determines whether the row (column) consists of four zero bits. If logic 130 determines that a row (or column) consists entirely of zero bits, it asserts appropriate control bits that cause transformation operations that would otherwise be performed subsequently by engine 122 on the row (column) to be bypassed, and typically also causes predetermined values (e.g., zeroes) to be output from multiplexer 139 of unit 124 in response to the row (column) without performance of actual transformation operations by one or both of engine 122 and unit 124 on the values of the row (column).

In some implementations, logic 130 determines whether the first data value of each individual row (or column) of data values asserted to it from multiplexer 129 is a non-zero value and all other values of the row (or column) are zero values. In response to identifying a row (column) consisting of zero values except for an initial non-zero value, such an implementation of logic 130 asserts appropriate control bits that cause transformation operations that would otherwise be performed subsequently by engine 122 on the row (column) to be bypassed, and typically also causes predetermined values (e.g., zeroes) to be output from multiplexer 139 of unit 124 in response to the row (column) without performance of actual transformation operations by one or both of engine 122 and unit 124 on the values of the row (column).

Zero detection logic 132 of engine 122 is configured to perform zero detection on a first subset (e.g., the first half, which are the first two data values) of each row (or column) asserted to engine 122 from unit 120 to determine whether all the data values of such first subset are zero values (e.g., it performs step 26 of FIG. 4). If logic 132 determines that the first subset (e.g. half row or half column) consists entirely of zero bits, it asserts appropriate control bits that cause transformation operations that would otherwise be performed subsequently by engine 122 on the first subset to be bypassed, and typically causes predetermined values (e.g., zeroes) to be output from multiplexer 140 of engine 122 in response to the first subset without performance of actual transformation operations by engine 122 on the values of the first subset. If logic 132 determines that the first subset (e.g., the first half) of the current row (column) includes at least one non-zero value, zero detection logic units 135 and 136 perform zero detection on the first and second values of the first subset.

If logic 135 determines that a first data value of the first subset of the current row (column) is a zero value, it asserts a control bit to multiplication circuit 141 (to whose first input the transform constant C0 is asserted, and to whose second input the zero data value of the current row or column is asserted) to cause circuit 141 to perform a multiplication operation on the value asserted to its second input without updating the previous value asserted to its first input, to avoid consuming power that would otherwise be consumed to toggle the first input to an updated value of the constant C0.

Similarly, if logic 136 determines that a second data value of the first subset of the current row (column) is a zero value, it asserts a control bit to multiplication circuit 142 (to whose first input the transform constant C1 is asserted, and to whose second input such zero data value of the current row or column is asserted) to cause circuit 142 to perform a multiplication operation on the value asserted to its second input without updating the previous value asserted to its first input, to avoid consuming power that would otherwise be consumed to toggle the first input to an updated value of the constant C1.

Zero detection logic 134 of engine 122 is configured to perform zero detection on a second subset (e.g., the second half, which are the second two data values) of each row (or column) asserted to engine 122 from unit 120 to determine whether all the data values of such second subset are zero values (i.e., it performs step 40 of FIG. 4). If logic 134 determines that the second subset consists entirely of zero bits, it asserts appropriate control bits that cause transformation operations that would otherwise be performed subsequently by engine 122 on the second subset (e.g., half row or half column) to be bypassed, and typically causes predetermined values (e.g., zeroes) to be output from multiplexer 141 of engine 122 in response to the second subset without performance of actual transformation operations by engine 122 on the values of the second subset. If logic 134 determines that the second subset of the current row (column) includes at least one non-zero value, zero detection logic units 137 and 138 perform zero detection on the first and second values of the second subset.

If logic 137 determines that a first data value of the second subset of the current row (column) is a zero value, it asserts a control bit to multiplication circuit 143 (to whose first input the transform constant C2 is asserted, and to whose second input the zero data value of the current row or column is asserted) to cause circuit 143 to perform a multiplication operation on the value asserted to its second input without updating the previous value asserted to its first input, to avoid consuming power that would otherwise be consumed to toggle the first input to an updated value of the constant C2.

Similarly, if logic 138 determines that a second data value of the second subset of the current row (column) is a zero value, it asserts a control bit to multiplication circuit 144 (to whose first input the transform constant C3 is asserted, and to whose second input such zero data value of the current row or column is asserted) to cause circuit 144 to perform a multiplication operation on the value asserted to its second input without updating the previous value asserted to its first input, to avoid consuming power that would otherwise be consumed to toggle the first input to an updated value of the constant C3.

Each of multiplexers 129, 140, 141, 150, 151, 152, and 153 of FIG. 6 is controlled during operation to pass through to its output one of the values being asserted to its inputs during the current cycle of pipelined operation of the FIG. 6 system. Each of circuits 156 and 157 of FIG. 6 is an addition circuit that is controlled during operation to assert at its output the sum of the values being asserted to its inputs during the current operating cycle of the FIG. 6 system. Circuits 154 and 155 of FIG. 6 are delay circuits (implemented as flip-flops) having latency appropriate for the specific transform being performed by the FIG. 6 system.

Some alternative embodiments of the invention consist of or include circuitry identical to FIG. 6, except in that logic circuitry 132, 134, 135, 136, 137, and 138 of FIG. 6 is omitted, and the functions of the omitted circuitry are performed by a modified version of logic circuitry 130 of FIG. 6. Specifically, such a modified version of logic 130 would typically be configured to determine whether an entire block of data to be transformed consists (i.e., all four rows or columns of a 4×4 block of data to be transformed consist) entirely of zero values, whether each row (or column) of data of a block to be transformed consists entirely of zero values, whether each half of each row (or column) of data of a block to be transformed consists entirely of zero values, and whether each data value of each half row (or column) of data of a block to be transformed is a zero value, and asserts (to other elements of the system) in response to such determinations control signals of the types described above that are asserted by logic circuitry 130, 132, 134, 135, 136, 137, and 138 of FIG. 6.

The system of FIG. 6 can be a subsystem of a portable media player or another portable data processing system (or a data processing system not intended to be portable), e.g., one having video decoding capability. Such a media player or other processing system can and typically would include additional elements that are not shown in FIG. 6.

It should be understood that in order to implement various embodiments of the invention to perform any of many different 2D transforms on blocks of data having any of many different formats, variations on the specific steps shown and described with reference to FIG. 4 and on the specific structure shown and described with reference to FIGS. 5 and 6 would be implemented.

It should be also understood that while some embodiments of the present invention are illustrated and described herein, the invention is defined by the claims and is not to be limited to the specific embodiments described and shown.

What is claimed is:

1. A system comprising:
   row transform circuitry configured to perform a row transform on first data to generate second data; and
   column transform circuitry configured to perform a column transform on said second data to generate third data, and
   wherein said row transform circuitry is configured to separate a row of said first data into a first portion and a second portion, wherein said first portion of said row comprises a first plurality of values, and wherein said second portion of said row comprises a second plurality of values,
   wherein said row transform circuitry is configured to determine whether said first plurality of values of said first portion of said comprises at least one zero value,
   wherein said row transform circuitry is further configured to determine whether said second plurality of values of said second portion of said row comprises at least one zero value,
   wherein said row transform circuitry is further configured to process said first portion and said second portion contemporaneously, and
   wherein said row transform circuitry is further configured to perform, when performing said row transform, an operation associated with at least one data value comprising a zero value, wherein said at least one data value is selected from a group consisting of at least one data value of said first portion of said row and at least one data value of said second portion of said row.

2. The system of claim 1, wherein said operation comprises bypassing at least one transformation operation.

3. The system of claim 1, wherein said operation comprises performing, in a reduced-power manner, at least one transformation operation on said at least one data value comprising a zero value.

4. The system of claim 3, wherein said at least one transformation operation comprises a multiplication operation.

5. The system of claim 1 further comprising:
   a buffer coupled to said row transform circuitry and said column transform circuitry, wherein said row transform circuitry is configured to store said second data in said buffer, and wherein said column transform circuitry is configured to access said second data from said buffer.

6. The system of claim 1, wherein said row transform circuitry is configured to reorder data values of said first data when performing said row transform.

7. The system of claim 1, wherein said row transform and said column transform are associated with an inverse discrete cosine transform.

8. The system of claim 1, wherein said row transform circuitry is configured to separate said row of said first data based on a type of transform to be implemented.

9. A method comprising:
   performing, using circuitry, a row transform on first data to generate second data;
   performing a column transform on said second data to generate third data, and
   wherein said performing said row transform further comprises:
       separating a row of said first data into a first portion and a second portion, wherein said first portion of said row comprises a first plurality of values, and wherein said second portion of said row comprises a second plurality of values;
       determining whether said first plurality of values of said first portion of said row comprises at least one zero value;
       determining whether said second plurality of values of said second portion of said row comprises at least one zero value;
       processing said first portion and said second portion contemporaneously; and
       performing an operation associated with at least one data value comprising a zero value, wherein said at least one data value is selected from a group consisting of at least one data value of said first portion of said row and at least one data value of said second portion of said row.

10. The method of claim 9, wherein said operation comprises bypassing at least one transformation operation.

11. The method of claim 9, wherein said performing said operation further comprises performing, in a reduced-power manner, at least one transformation operation on said at least one data value comprising a zero value.

12. The method of claim 11, wherein said at least one transformation operation comprises a multiplication operation.

13. The method of claim 9 further comprising:
   storing said second data in a buffer after said performing said row transform; and
   accessing said second data from said buffer before performing said column transform.

14. The method of claim 9, wherein said performing said row transform further comprises reordering data values of said first data.

15. The method of claim 9, wherein said row transform and said column transform are associated with an inverse discrete cosine transform.

16. The method of claim 9, wherein said separating further comprises separating said row of said first data based on a type of transform to be implemented.

* * * * *